(12) United States Patent
Jaeger

(10) Patent No.: US 6,912,895 B1
(45) Date of Patent: Jul. 5, 2005

(54) COOLANT FLOW MONITORING SYSTEM FOR AN ENGINE COOLING SYSTEM

(75) Inventor: Matthew W. Jaeger, Stillwater, OK (US)

(73) Assignee: Brunswick Corporation, Lake Forest, IL (US)

(*) Notice: Subject to any disclaimer, the term of this patent is extended or adjusted under 35 U.S.C. 154(b) by 0 days.

(21) Appl. No.: 10/462,418

(22) Filed: Jun. 16, 2003

(51) Int. Cl.⁷ ............................................. G01M 15/00
(52) U.S. Cl. .................................... 73/118.1; 73/861.52
(58) Field of Search ............................... 73/116, 117.2, 73/117.3, 118.1, 119 R, 861.42, 861.44, 861.45, 73/861.52; 340/438, 449, 450; 701/29

(56) References Cited

U.S. PATENT DOCUMENTS

| | | | |
|---|---|---|---|
| 3,739,366 A | 6/1973 | Lace | 340/239 |
| 3,793,997 A | 2/1974 | Banner | 123/41.15 |
| 4,062,231 A * | 12/1977 | Mercik et al. | 73/116 |
| 4,235,100 A * | 11/1980 | Branchini | 73/49.7 |
| 4,494,402 A * | 1/1985 | Carney | 73/40 |
| 4,682,493 A | 7/1987 | Tenenbaum | 73/118.1 |
| 5,794,575 A * | 8/1998 | Sonnemann et al. | 123/41.08 |
| 5,996,331 A | 12/1999 | Palmer | 60/39.02 |
| 6,457,442 B1 * | 10/2002 | Fuchs et al. | 123/41.29 |
| 2003/0139894 A1 * | 7/2003 | Ryan et al. | 702/132 |
| 2003/0221638 A1 * | 12/2003 | Haase | 123/41.01 |

* cited by examiner

Primary Examiner—Eric S. McCall
(74) Attorney, Agent, or Firm—William D. Lanyi

(57) ABSTRACT

A flow monitor is removably connectable in serial fluid communication with a coolant conduit of an engine cooling system. By providing a flow restrictor between upstream and downstream ports, a differential pressure is created between the upstream and downstream ports. The measured magnitude of this differential pressure allows a microprocessor, or similarly configured component, to determine the actual flow rate of the coolant passing through the coolant conduit between the upstream and downstream pressure sensing ports. In this way, actual flow is measured to indicate the proper operation of the cooling system.

17 Claims, 7 Drawing Sheets

COOLANT FLOW MONITORING SYSTEM FOR AN ENGINE COOLING SYSTEM

BACKGROUND OF THE INVENTION

1. Field of the Invention

The present invention relates generally to a cooling system monitor and, more particularly, to the use of differential pressure to determine whether a sufficient flow of cooling water is passing through the cooling system of an internal combustion engine.

2. Description of the Prior Art

U.S. Pat. No. 3,739,366, which issued to Lace on Jun. 12, 1973, describes a flowmeter for an engine cooling system. The flowmeter senses the flow rate in an engine cooling system to provide an indication of an extraordinary condition as when the water pump or one of the fluid conducing hoses becomes inoperative. The flowmeter sensor comprises a pair of stationary electrodes located adjacent to and on either side of a flexible electrode which is deflected by the current flow. A relatively high frequency alternating current produces a field between the two stationary electrodes and the deflecting electrode will assume a potential base on its location in the field. A threshold detection circuit is connected to the deflecting electrode whereby a change in its apparent voltage will actuate a warning device.

U.S. Pat. No. 4,682,493, which issued to Tenenbaum on Jul. 28, 1987, describes a cooling system monitor. Apparatus for monitoring the cooling system of a liquid cooled automotive engine is described. The apparatus provides a warning of a malfunction within the system and diagnostic information of what the malfunction is. The compact apparatus is easily mounted on the inlet radiator hose and includes elements for measuring the coolant level, flow rate, pressure and temperature.

U.S. Pat. No. 3,793,997, which issued to Banner on Feb. 26, 1974, describes an engine liquid flow indicating device means. Liquid flow sensors connected to an engine or power means requiring liquid cooling are described. Sensors measure liquid flow velocity and volume factors on a visual flow gauge in increments of low, medium and high volume readouts in conjunction with a warning means, for liquid flow and pressure indication.

U.S. Pat. No. 4,062,231, which issued to Mercik et al on Dec. 13, 1977, describes engine cooling system diagnostics. A single pressure transducer tapped into the cooling system of an engine, downstream of the pump, is used to measure coolant pressure at high idle and coolant pressure at low idle while the water temperature is such as to assure the thermostat is closed. The pressure readings are equivalent to the pressure across an orifice or restriction formed by the coolant bypass when the thermostat is closed. The combination of high idle pressure and difference between high idle pressure and low idle pressure permit diagnosing whether the pump is faulty or whether there is unduly large restriction in the engine, which otherwise could not be known with a single pressure reading.

U.S. Pat. No. 5,996,331, which issued to Palmer on Dec. 7, 1999, describes a passive turbine coolant regulator responsive to engine load. A passive feedback-controlled regulator and method for regulating gas turbine bleed air is provided, which automatically regulates the flow of coolant air directed to the turbine vanes, blades, and other hot section components based on the inherent differential pressure between the diffused compressor discharge pressure and the compressor impeller exit air. The differential pressure used to operate the regulator is a measure of the turbine mass flow rate, and, therefore is a measure of the instantaneous engine coolant flow requirement.

The patents described above are hereby expressly incorporated by reference in the description of the present invention.

SUMMARY OF THE INVENTION

A coolant flow monitoring system for an engine cooling system, made in accordance with the preferred embodiment of the present invention, comprises an engine having a heat producing component and a coolant passage disposed in thermal communication with the heat producing component. A coolant conduit is connected in fluid communication with the coolant passage and a flow restrictor is disposed within the coolant passage. First and second pressure sensing locations of the coolant conduit are provided and the flow restrictor is located between the first and second pressure sensing locations. A differential pressure sensing device is connected in pressure sensing relation with the first and second pressuring sensing locations, whereby a differential pressure between the first and second pressure sensing locations is representative of a magnitude of coolant flow passing through the coolant conduit.

In a preferred embodiment, the first and second pressure sensing locations can be disposed on a tubular member which is removably connected in serial fluid communication with the coolant conduit and the flow restrictor is disposed within the tubular member between the first and second pressure sensing locations. The flow restrictor can be an orifice formed in a wall disposed within the coolant conduit between the first and second pressure sensing locations, a venturi passage disposed within the coolant conduit between the first and second pressure sensing locations, or an inherent resistance to coolant flow within the coolant conduit and between the first and second pressure sensing locations.

The differential pressure sensing device can comprise a first pressure sensor connected in pressure sensing relation with the coolant conduit at the first pressure sensing location and a second pressure sensor connected in pressure sensing relation with the coolant conduit at the second pressure sensing location. It may also comprise a single sensor that is connected to both pressures and is configured to provide a single signal which is representative of differential pressure. The differential pressure sensing device can comprise a microprocessor which is connected in signal communication with the first and second pressure sensor and configured to determine a coolant flow magnitude as a function of first and second pressures provided by the first and second pressure sensors.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
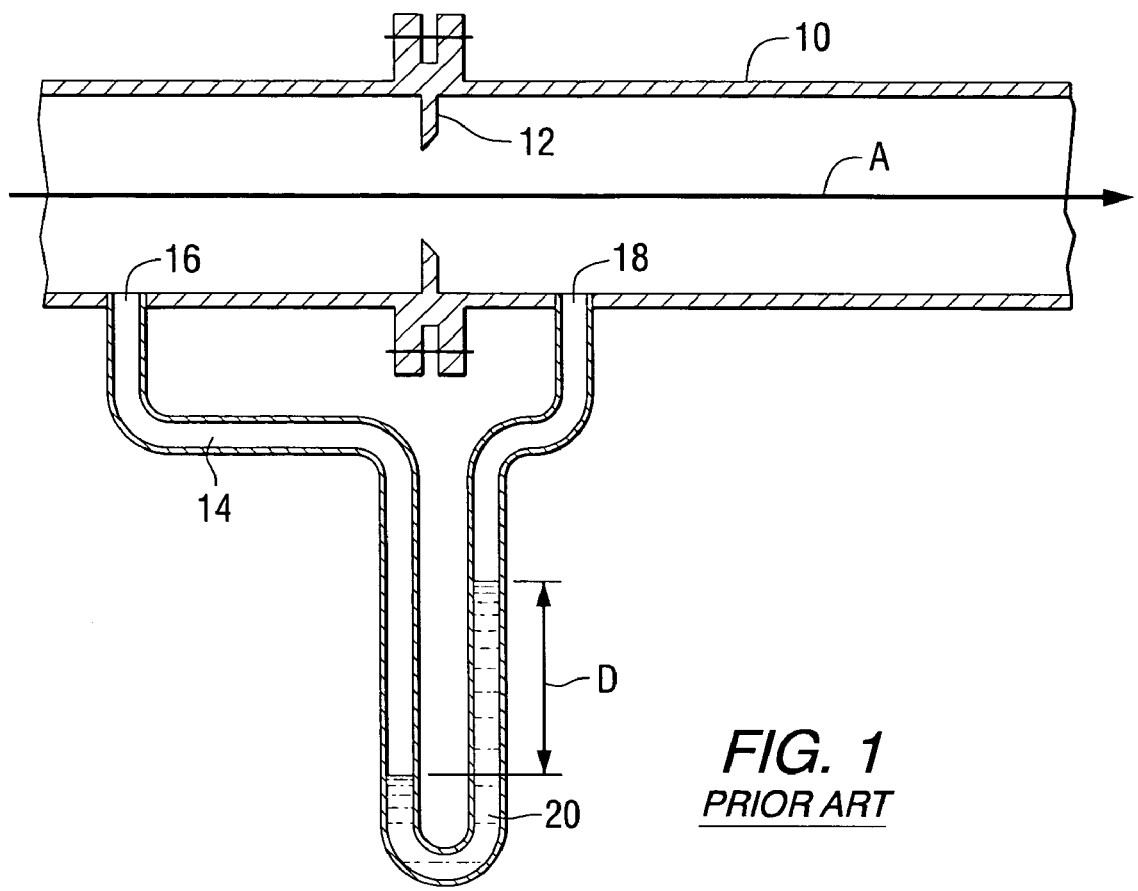
FIGS. 1 and 2 are schematic representations which illustrate the use of a flow restrictor in conjunction with a stream flowing through a conduit.

Throughout the description of the preferred embodiment of the present invention, like components will be identified by like reference numerals.

Figure 2:
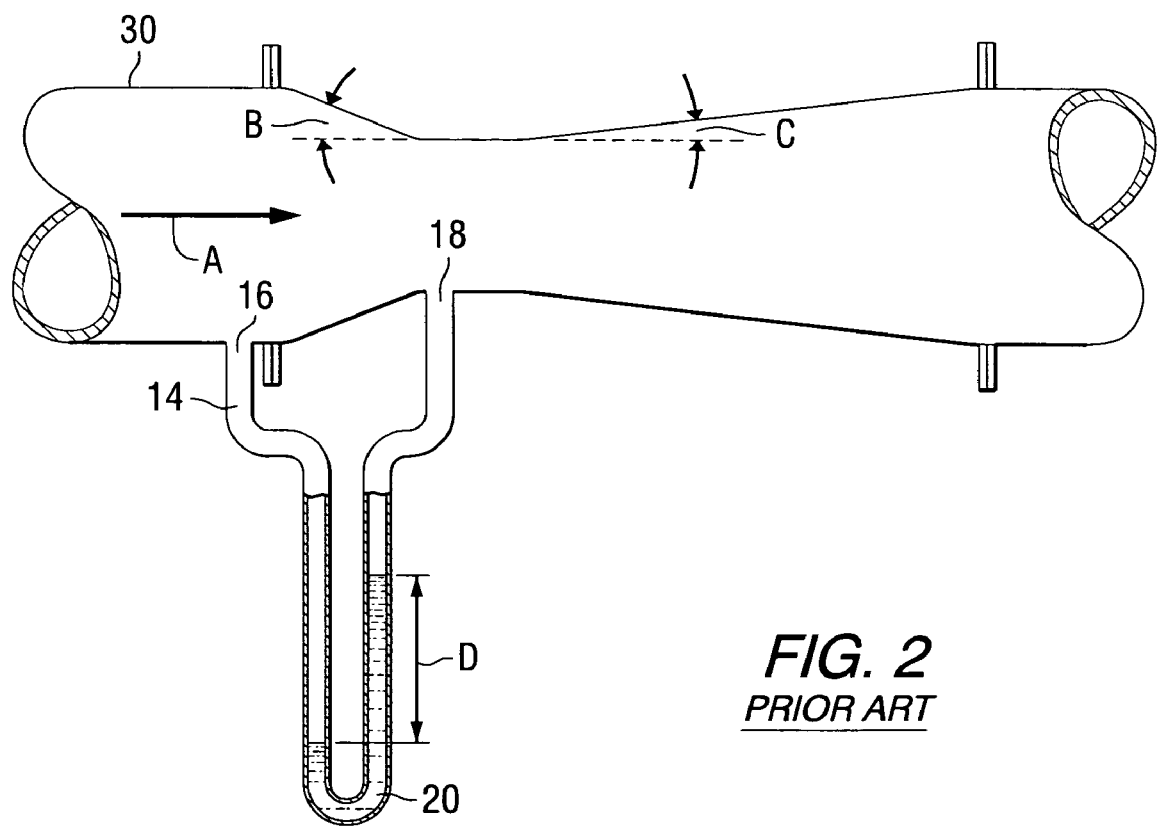

FIGS. 1 and 2 are well known illustrations of basic physical principals regarding the flow of fluid through a conduit. FIG. 1 shows a conduit 10 in which an orifice plate 12 is disposed in order to partially restrict the flow of fluid through the conduit 10. The direction of fluid flow is represented by arrow A. In this well known illustration of the orifice principal, a tube 14 is connected between an upstream location 16 and a downstream location 18 relative to the position of the orifice plate 12. If a liquid 20 is disposed within the tube 14, the pressure drop across the orifice results in a difference in liquid level which is identified by arrow D in FIG. 1. The pressure drop across the orifice plate 12 changes as a function of the flow rate of fluid through the conduit 10.

FIG. 2 shows a conduit 30 that is shaped to have a venturi configuration. Arrow A represents the direction of fluid flow through the venturi restriction. As in FIG. 1, a tube 14 is partially filled with a liquid 20 to illustrate the difference in pressure from a location 16 upstream from the venturi to a position 18 downstream from the venturi. Angles B and C can be selected to regulate the amount of boundary layer separation and the operating characteristics of the venturi as fluid passes through it.

With continued reference to FIGS. 1 and 2, it can be seen that a flow restrictor, such as the orifice plate 12 in FIG. 1 or the tapered restriction resulting from angle B in FIG. 2 to form a venturi, creates a pressure differential between an upstream location 16 and a downstream location 18. This characteristic that results from a flow restrictor in a liquid channel is used by the present invention to achieve an advantageous result. The venturi configuration shown in FIG. 2 is preferable in certain applications, such as marine cooling systems, because it is less prone to accumulated debris and plugging.

Figure 3:
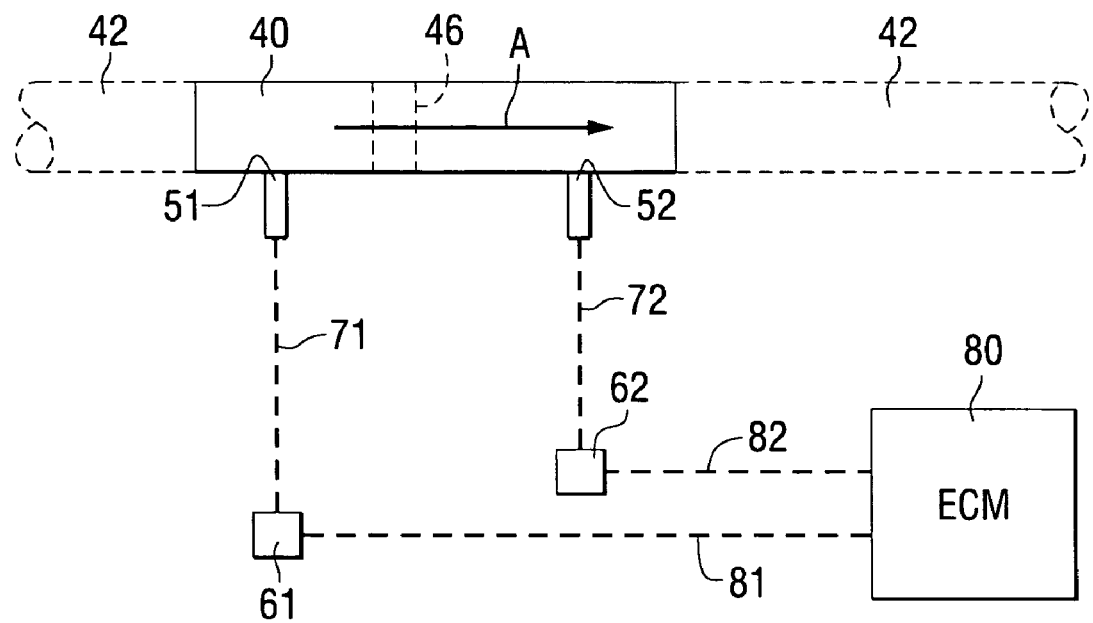
FIG. 3 shows one application of the present invention which relates to the measurement of a fluid flow rate.

FIG. 3 shows the present invention employed as a flow monitoring system to assure that appropriate magnitudes of flow rate are available in a cooling system of an internal combustion engine. A tubular member 40 is removably connected in serial fluid communication with a cooling conduit 42 so that a coolant flowing through the coolant conduit 42, as represented by arrow A, passes through the tubular member 40. A flow restrictor 46, which is represented by dashed lines in FIG. 3, creates a pressure differential between a first location 51 upstream from the flow restrictor 46 and a second location 52 downstream from the flow restrictor 46. In the application shown in FIG. 3, a first pressure sensor 61 is connected in pressure sensing relation with the first pressure sensing location 51. Similarly, a second pressure sensor 62 is connected in signal communication with the second pressure sensing location 52. These sensing connections are identified by dashed lines 71 and 72, respectively. A microprocessor, such as an engine control module 80, receives signals from the first and second pressure sensors, on lines 81 and 82, respectively. The difference in pressure between the first pressure sensing location 51 and the second pressure sensing location 52 results from the flow of liquid through the flow restrictor 46. The flow restrictor 46 can be an orifice as described above in conjunction with FIG. 1, a venturi as described above in conjunction with FIG. 2, or an inherent resistance to liquid flow resulting from the shape or configuration of the conduit through which the fluid flows between the first and second pressure sensing locations, 51 and 52. As will be described below, the rate of coolant flow through the coolant conduit 42 can be determined as a function of the differential pressure between the upstream and downstream pressure sensing location, 51 and 52.

Figure 4:
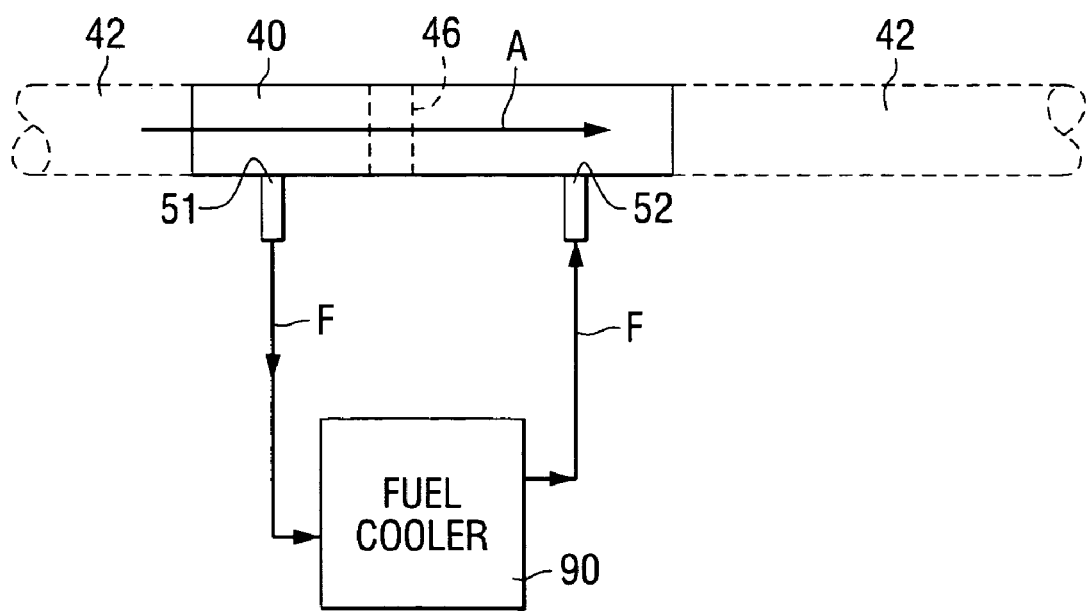
FIG. 4 shows a different embodiment of the present invention in which a bypass flow is provided to a secondary heat exchanging device.

FIG. 4 shows an alternate application of the present invention. In certain situations, it is advantageous to provide a stream of cooling water to a peripheral device, such as a fuel cooler, transmission oil cooler, or other component with a heat exchanging capability. In FIG. 4, a fuel cooler 90 is connected between the first and second pressure sensing locations, 51 and 52. Because of the presence of the flow restrictor 46, a portion of the coolant flow will pass in the direction represented by arrows F. The amount of flow through the fuel cooler 90 depends on the relative resistances to fluid flow represented by the flow restrictor 46 and the internal resistance of the heat exchanger associated with the fuel cooler 90. After passing through the fuel cooler 90, the flow represented by arrows F rejoins the main stream of coolant flowing in the direction represented by arrow A in coolant conduit 42. By inserting the tubular member 40 in serial fluid communication with the coolant conduit 42, a coolant supply can be provided to a peripheral device such as a fuel cooler 90. This allows peripheral devices to be cooled without requiring complicated and expensive plumbing to each of those devices. This application of the present invention also provides a convenient method for cooling devices which would be too restrictive if they were connected in serial fluid communication with the main portion of the cooling system.

Figure 5:
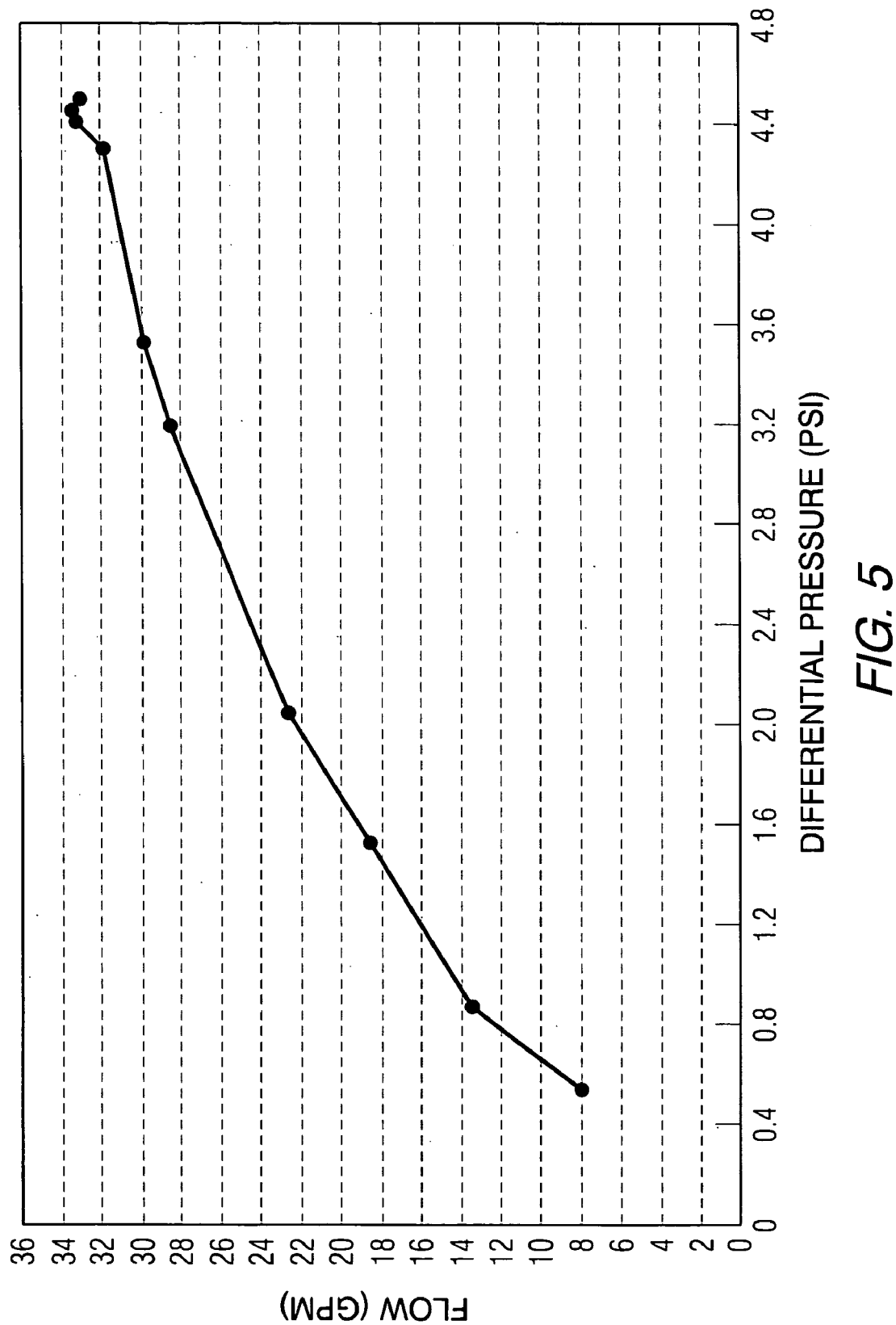
FIG. 5 is a graphical representation of flow through the present invention as a function of the measured differential pressure, as shown in FIG. 3.

FIG. 5 is a graphical representation showing an empirically determined relationship between the rate of flow, measured in gallons per minute (GPM), through the coolant conduit 42 in FIG. 3 and the differential pressure measured by the first and second pressure sensors, 61 and 62. As can be seen in FIG. 5, the differential pressure value allows the engine control module 80 to determine the flow rate of coolant through the coolant conduit 42 as a function of the differential pressure. This, in turn, allows the engine control module 80 to monitor the flow rate of the coolant to make sure that a blockage has not occurred or that some other equipment failure has not caused the flow rate to decrease to unacceptably low magnitudes. By measuring the differential pressure between the first and second pressure sensors, 61 and 62, the microprocessor of the engine control module 80 can therefore determine actual flow rate. In known systems, a single pressure sensor can mistakenly assume that a relatively high pressure indicates a satisfactory flow rate. This is not always true since a blockage can result in a relatively high pressure within the coolant conduit even though no flow of coolant exists. Inserting this type of device into a marine cooling system can reduce the overall flow of coolant through the system because of the introduction of the restriction. This effect should be quantified by testing in order to avoid any deleterious effects on the overall cooling system. In some cases, the flow rate of coolant through the system can be reduced by as much as 10%.

Figure 6:
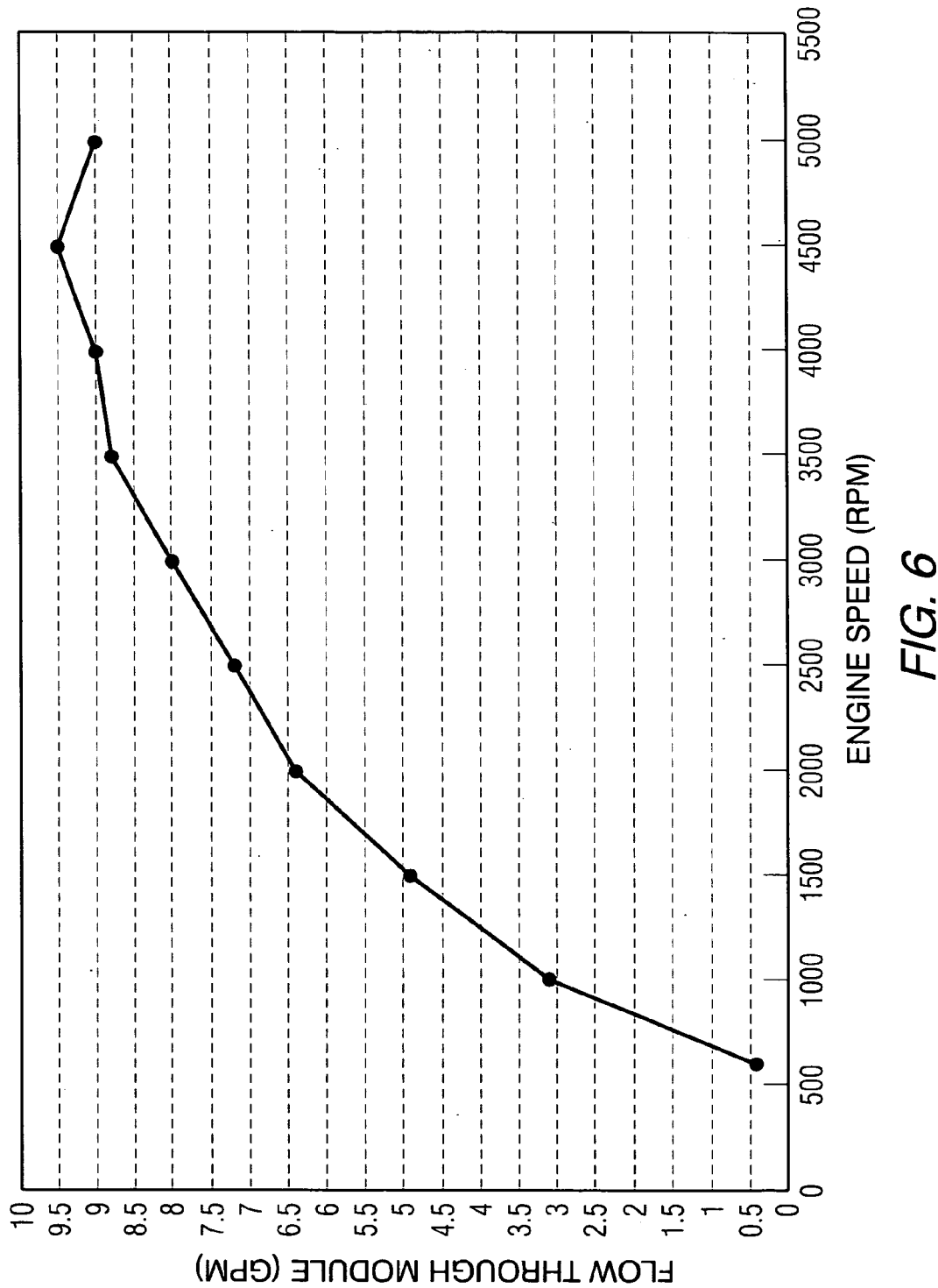
FIG. 6 is a graphical representation of the flow through a secondary module as a function of engine speed when the present invention is used in an embodiment such as that shown in FIG. 4.

FIG. 6 is a graphical representation of the coolant flow through the fuel cooler 90, or other peripheral device, as a function of engine speed. The data represented graphically in FIG. 6 is empirical. As can be seen, the flow of coolant through the module, or fuel cooler 90, increases as a function of engine speed to provide increased cooling capacity to the heat exchanger of the fuel cooler 90.

Figure 7:
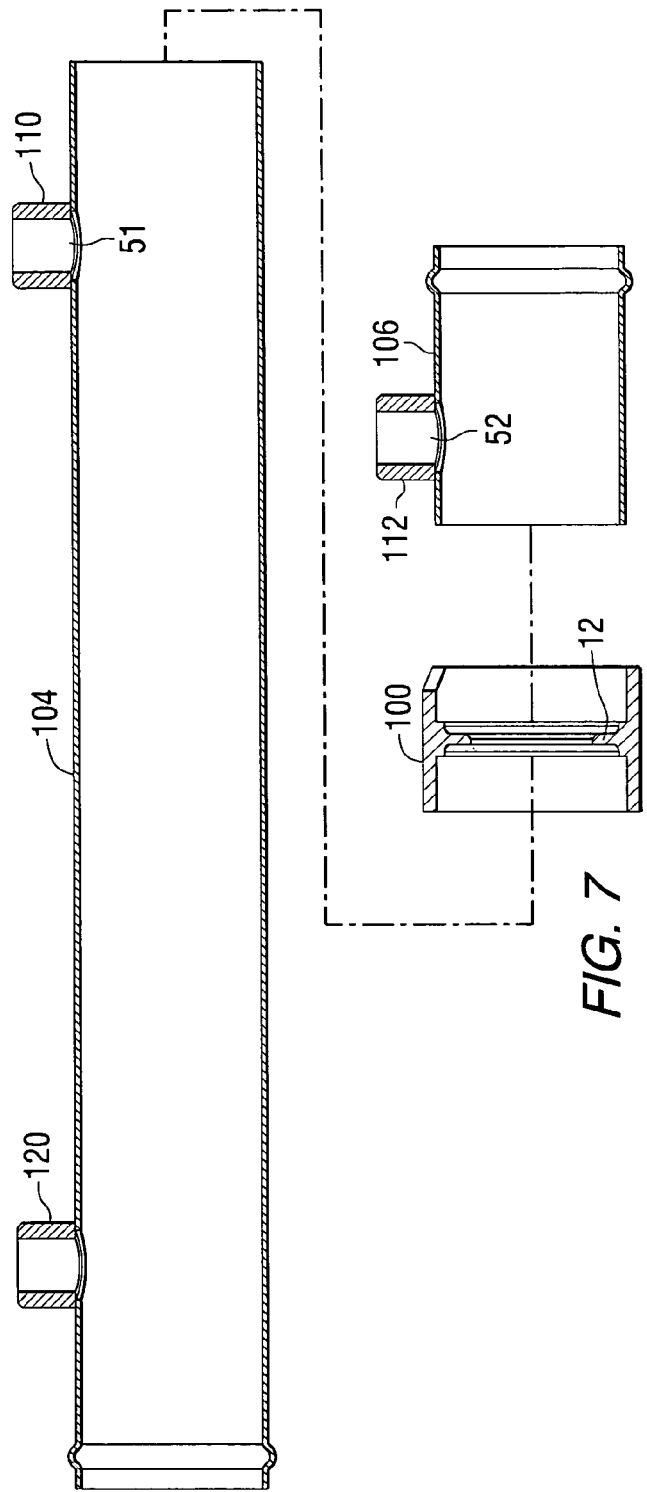
FIG. 7 is an exploded sectional view of a tubular member used to provide the present invention.

FIG. 7 is an exploded sectional view of the tubular member 40 which is described above in conjunction with FIGS. 3 and 4. An orifice portion 100 is formed to provide a portion of the overall tubular structure 40 while also containing the orifice plate 12 which is formed as an integral portion of its tubular shape. An upstream conduit 104 is shaped to fit into the orifice portion 100. A downstream portion 106 is also shaped to fit into the other end of the orifice portion 100. Two of the fluid ports, 110 and 112, are located at the first and second pressure sensing locations, 51 and 52, respectively. An additional fluid port 120 is also shown in FIG. 7. Although not necessary in all applications of the present invention, the additional fluid port 120 allows an auxiliary sensor, such as temperature or pressure sensor, to be disposed in sensing communication with the coolant passing through the tubular member.

Figure 8:
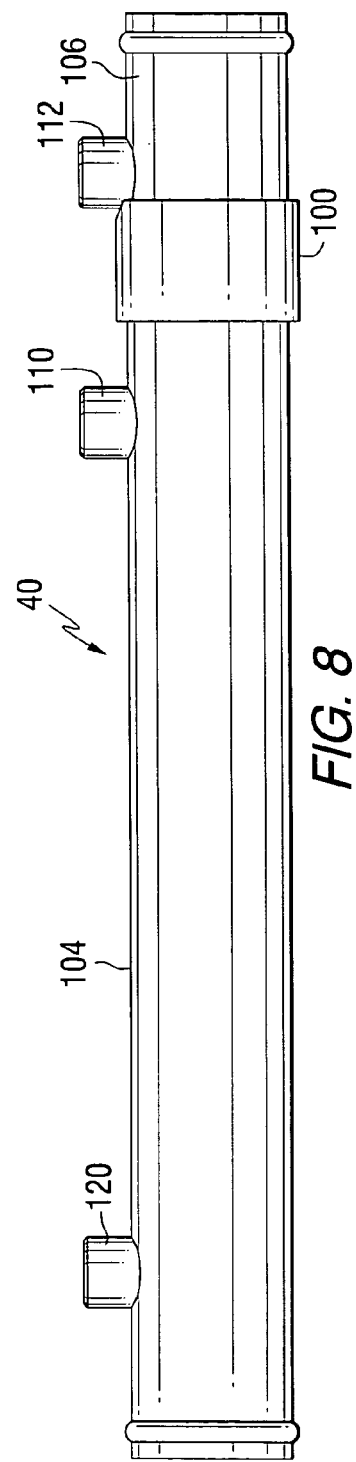
FIG. 8 is a side view of the tubular member shown in FIG. 7.

FIG. 8 shows the assembled tubular member 40 with its three ports, 110, 112, and 120, its upstream conduit 104, its downstream conduit 106, and its orifice portion 100 connected therebetween. Again, it should be understood that the additional port 120 is not required in all embodiments of the present invention.

Figure 9:
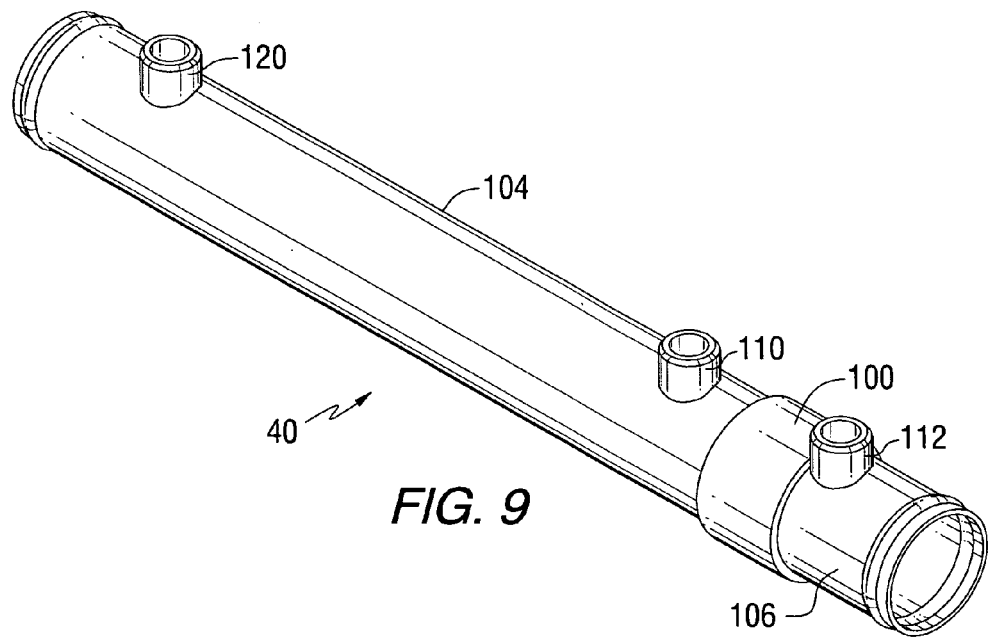
FIG. 9 is an isometric view of a tubular member made in accordance with the present invention.

FIG. 9 is an isometric view of the tubular member 40 with its three ports, 110, 112, and 120, and its three sections, 104, 106, and 100, assembled together.

Figure 10:
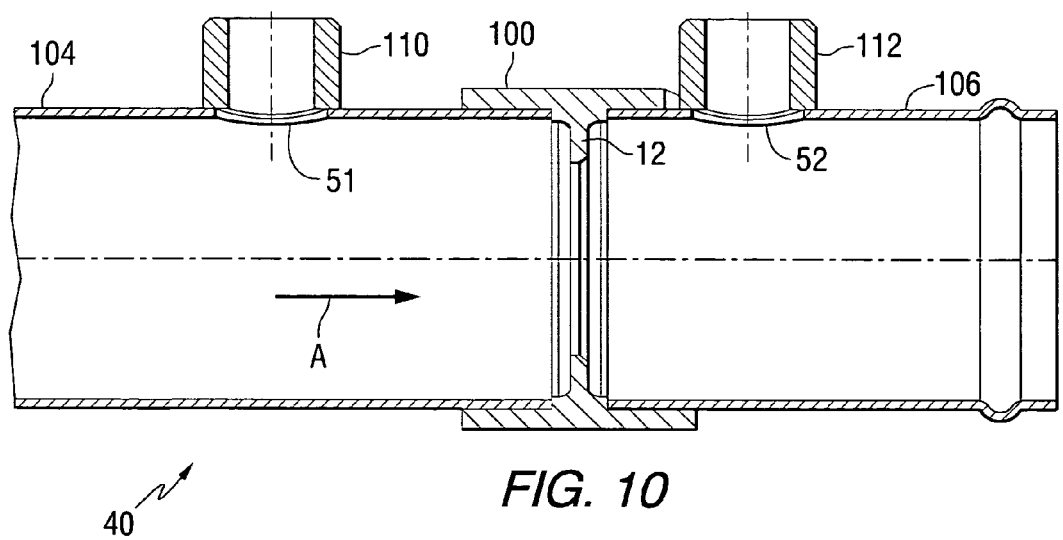
FIG. 10 is a section view of a portion of the tubular member made in conjunction with the present invention.

FIG. 10 is a sectional view of a portion of the tubular member 40 showing where the upstream section 104 and the downstream section 106 are joined to the orifice section 100. The orifice plate 12 is formed as an integral portion of the orifice section 100. The upstream and downstream pressure sensing locations, 51 and 52, are located at the upstream port 110 and downstream port 112, respectively. It should be understood that the tubular member 40 can be formed as one single device rather than three sections that are assembled together. The method of making the tubular member 40 is not limiting to the present invention.

Figure 11:
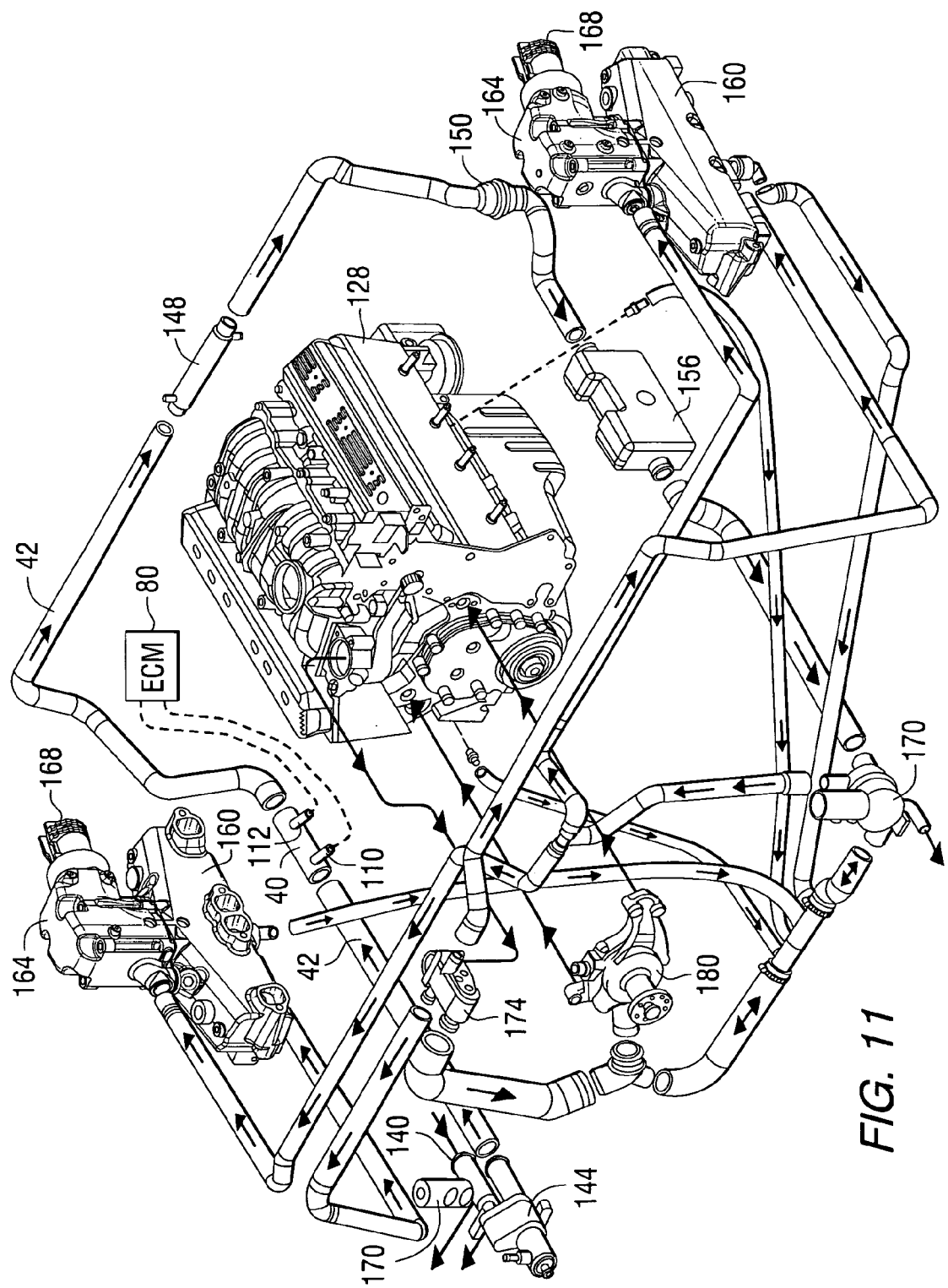
FIG. 11 is an isometric exploded view of a cooling system for a marine propulsion device.

FIG. 11 is an exploded isometric view of a cooling system for a marine engine 128. From a seawater inlet 140, a water pump 144 induces a flow of water through a coolant conduit 42. The cooling water also flows through a power steering cooler 148, a check valve 150, and a fuel cooler 156. The water is also directed to flow through the exhaust manifold 160 and exhaust elbows 164. For purposes of reference, the exhaust elbows 164 each have exhaust outlets 168 through which the cooling water is returned to the body of water from which it was originally drawn by the water pump 144. The cooling water mixes with the exhaust at the exhaust outlets 168. Also shown in FIG. 11, two drain actuators 170 allows the cooling system to be drained by the operator of the marine vessel. Reference numeral 174 identifies a thermostat housing and reference numeral 180 identifies a water circulating pump.

As described above in conjunction with FIGS. 3 and 4, the present invention can be used to serve various beneficial purposes. A tubular member 40 is shown in FIG. 11 at a location where it is inserted into the coolant conduit 42. The upstream and downstream pressure sensing ports, 110 and 112, are connected in signal communication with an engine control module (ECM) 80. In this way, the pressure drop caused by the internal flow restrictor (not shown in FIG. 11) enables the engine control module 80 to determine the actual flow of coolant through the coolant conduit 42. Rather than depending on a single pressure measurement which can lead to false conclusions in the event of a blockage, the present invention actually allows the flow rate to be determined as a function of differential pressure through the orifice or other flow restrictor. If a blockage occurs or the water pump 144 fails, the flow rate will decrease significantly and the differential pressure will therefore also decrease. This will allow the engine control module 80 to quickly identify a problem within the cooling system.

With continued reference to FIG. 11, it should be understood that a peripheral or secondary cooling function can also be performed through the use of the tubular member 40. Instead of connecting pressure sensors, in the pressure sensing ports, 110 and 112, to an engine control module 80, the ports could be connected in fluid communication with an inlet and outlet of a device, such as the power steering cooler 148 or the fuel cooler 156. Although these two devices are shown in FIG. 11 as being connected in serial fluid communication with the coolant conduit 42, they could be connected in parallel fluid communication with the coolant conduit 42 through the use of the upstream and downstream ports, 110 and 112, as described above.

With reference to FIGS. 1–11, it can be seen that a coolant flow monitoring system for an engine cooling system, such as that shown in FIG. 11, made in accordance with the preferred embodiment of the present invention, comprises an engine 128 having a heat producing component. The heat producing component can be the combustion chambers and related devices. A coolant passage is disposed in thermal communication with the heat producing component of the internal combustion engine 128. As is well known to those skilled in the art, the coolant passage can be formed as integral cavities within the block and head of the engine 128 through which coolant liquid can be passed. A coolant conduit 42 is connected in fluid communication with the coolant passage. A flow restrictor is disposed within the coolant conduit 42. In a preferred embodiment of the present invention, the flow restrictor 46 is disposed within a tubular member 40 and between the upstream and downstream pressure sensing ports, 110 and 112. First and second pressure sensing locations, 110 and 112, are provided with the flow restrictor 46 being disposed between them. A differential pressure sensing device, such as the first and second pressure sensors, 61 and 62, and the microprocessor of the engine control module 80 is connected in pressure sensing relation with the first and second pressure sensing locations, 110 and 112. As a result, a differential pressure between the first and second pressure sensing locations is representative of a magnitude of coolant flow passing through the coolant conduit, as illustrated in FIG. 5.

The first and second pressure sensing locations, 110 and 112, are disposed on a tubular member 40 in a preferred embodiment of the present invention. The tubular member 40 is removably connected in serial fluid communication with the coolant conduit 42. The flow restrictor 46 is disposed within the tubular member 40 between the first and second pressure sensing locations, 110 and 112. The flow restrictor 46 can be an orifice formed in an orifice plate 12 which is disposed within the coolant conduit between the first and second pressure sensing locations. In this terminology, the tubular member 40 is considered part of the coolant conduit 42. The flow restrictor can alternatively be a venturi passage disposed within the tubular member 40 of the coolant conduit 42 between the first and second pressure sensing location, 110 and 112. Alternatively, the flow restrictor can be an inherent resistance to coolant flow within the coolant conduit 42 between the first and second pressure sensing locations. In other words, various characteristics and shapes of the cooling system shown in FIG. 11 can provide a sufficient flow restriction function that two pressure sensing positions can be selected, upstream and downstream of the flow restriction, an the differential pressure can be used in the way described above.

The differential pressure sensing device can comprise a first pressure sensor 61 connected in pressure sensing relation with the coolant conduit 42 at the first pressure sensing location 110 and a second pressure sensor 62 can be connected in pressure sensing relation with the coolant conduit 42 at the second pressure sensing location 62. The differential pressure sensing device can comprise a microprocessor which is connected in signal communication with both the first and second pressure sensors, 61 and 62. Alternatively, a differential pressure sensor can be connected between the first and second pressure sensing locations, 110 and 112, and a differential pressure magnitude can be provided to the microprocessor of the engine control module 80.

With continued reference to FIGS. 1–11, the other use and application of the present invention allows a secondary or peripheral heat exchanging device, such as the power steering cooler 148 or the fuel cooler 156, to be connected between the first and second pressure sensing locations, 110 and 112, in order to divert a portion of the total coolant flow through the coolant conduit 42 into the peripheral heat exchanger device and then back into the main flow through the coolant conduit 42. The differential pressure caused by the flow restrictor creates a differential pressure which induces partial flow of the coolant through the secondary or peripheral component.

In either application of the present invention, few additional parts are necessary and the tubular member can easily be inserted into the coolant conduit 42 to perform its intended purpose.

Although the present invention has been described in considerable detail and illustrated to show specific embodiments, it should be understood that alternative embodiments are also within its scope.

What is claimed is:

1. A coolant flow monitoring system for an engine cooling system, comprising:
    an engine having a heat producing component;
    a coolant passage disposed in thermal communication with said heat producing component;
    a coolant conduit connected in fluid communication with said coolant passage;
    a flow restrictor disposed within said coolant conduit;
    a first pressure sensing location of said coolant conduit;
    a second pressure sensing location of said coolant conduit, said flow restrictor being between said first and second pressure sensing locations; and
    a differential pressure sensing device connected in pressure sensing relation with said first and second pressure sensing locations, whereby a differential pressure between said first and second pressure sensing locations is representative of a magnitude of coolant flow passing through said coolant conduit, said differential pressure sensing device comprising a first pressure sensor connected in pressure sensing relation with said coolant conduit at said first pressure sensing location and a second pressure sensor connected in pressure sensing relation with said coolant conduit at said second pressure sensing location.

2. The coolant flow monitoring system of claim 1, wherein:
    said first and second pressure sensing locations are disposed on a tubular member which is removably connected in serial fluid communication with said coolant conduit; and
    said flow restrictor is disposed within said tubular member between said first and second pressure sensing locations.

3. The coolant flow monitoring system of claim 1, wherein:
    said flow restrictor is an orifice formed in a wall disposed within said coolant conduit between said first and second pressure sensing locations.

4. The coolant flow monitoring system of claim 1, wherein:
    said flow restrictor is a venturi passage disposed within said coolant conduit between said first and second pressure sensing locations.

5. The coolant flow monitoring system of claim 1, wherein:
    said flow restrictor is an inherent resistance to coolant flow within said coolant conduit between said first and second pressure sensing locations.

6. The coolant flow monitoring system of claim 1, wherein:
    said differential pressure sensing device comprises a microprocessor which is connected in signal communication with said first and second pressure sensors and configured to determine a coolant flow magnitude as a function of first and second pressures provided by said first and second pressure sensors.

7. The coolant flow monitoring system of claim 1, wherein:
    said differential pressure sensing device comprises a microprocessor which is configured to determine a coolant flow magnitude as a function of a differential pressure magnitude between said first and second pressure sensing locations.

8. A coolant flow monitoring system for an engine cooling system, comprising:
    an engine having a heat producing component;
    a coolant passage disposed in thermal communication with said heat producing component;
    a coolant conduit connected in fluid communication with said coolant passage;
    a flow restrictor disposed within said coolant conduit;
    a first pressure sensing location of said coolant conduit;
    a second pressure sensing location of said coolant conduit, said flow restrictor being between said first and second pressure sensing locations; and
    a first pressure sensor connected in pressure sensing relation with said coolant conduit at said first pressure sensing location;
    a second pressure sensor connected in pressure sensing relation with said coolant conduit at said second pressure sensing location, whereby a difference between a first measured pressure at said first pressure sensing location and a second measured pressure at said second pressure sensing location, provided by said first and second pressure sensors, respectively, is representative of a rate of coolant flow passing through said coolant conduit.

9. The coolant flow monitoring system of claim 8, further comprising:
   a microprocessor connected in signal communication with said first and second pressure sensors and configured to determine said rate of coolant flow as a function of said first and second measured pressures provided by said first and second pressure sensors.

10. The coolant flow monitoring system of claim 9, wherein:
    said first and second pressure sensing locations are disposed on a tubular member which is removably connected in serial fluid communication with said coolant conduit; and
    said flow restrictor is disposed within said tubular member between said first and second pressure sensing locations.

11. The coolant flow monitoring system of claim 9, wherein:
    said flow restrictor is an orifice formed in a wall disposed within said coolant conduit between said first and second pressure sensing locations.

12. The coolant flow monitoring system of claim 9, wherein:
    said flow restrictor is a venturi passage disposed within said coolant conduit between said first and second pressure sensing locations.

13. The coolant flow monitoring system of claim 9, wherein:
    said flow restrictor is an inherent resistance to coolant flow within said coolant conduit between said first and second pressure sensing locations.

14. A coolant flow monitoring system for an engine cooling system, comprising:
    a tubular member having an inlet end and an outlet end;
    a first pressure sensing port disposed in fluid communication with an internal passage of said tubular member;
    a second pressure sensing port disposed in fluid communication with said internal passage of said tubular member;
    a flow restrictor disposed within said tubular member between said first and second pressure sensing ports; and
    a microprocessor, connected in signal communication with a pressure sensing system, configured to determine a rate of coolant flow through said tubular member as a function of a differential pressure magnitude between said first and second pressure sensing ports;
    an engine having a heat producing component;
    a coolant passage disposed in thermal communication with said heat producing component; and
    a coolant conduit connected in fluid communication with said coolant passage, said tubular member being connected in serial fluid communication with said coolant conduit, said pressure sensing system comprising first and second pressure sensors disposed in pressure sensing relation with said first and second pressure sensing ports.

15. The coolant flow monitoring system of claim 14, wherein:
    said flow restrictor is an orifice formed in a wall disposed within said coolant conduit between said first and second pressure sensing locations.

16. The coolant flow monitoring system of claim 14, wherein:
    said flow restrictor is a venturi passage disposed within said coolant conduit between said first and second pressure sensing locations.

17. The coolant flow monitoring system of claim 16, wherein:
    said engine is an internal combustion engine of a marine propulsion system.

* * * * *